Figure 7:
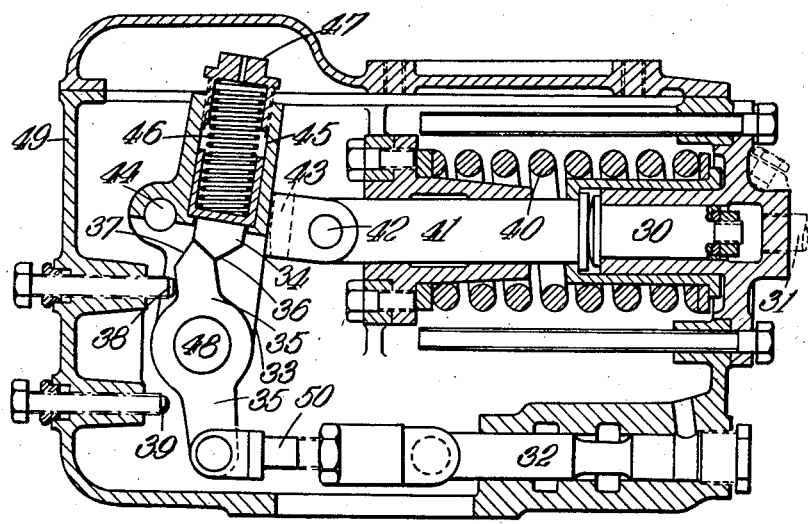

Feb. 20, 1934.   W. WALLACE   1,947,540
CONTROL GEAR FOR VARIABLE DELIVERY PUMPS
Filed April 2, 1931   3 Sheets-Sheet 1
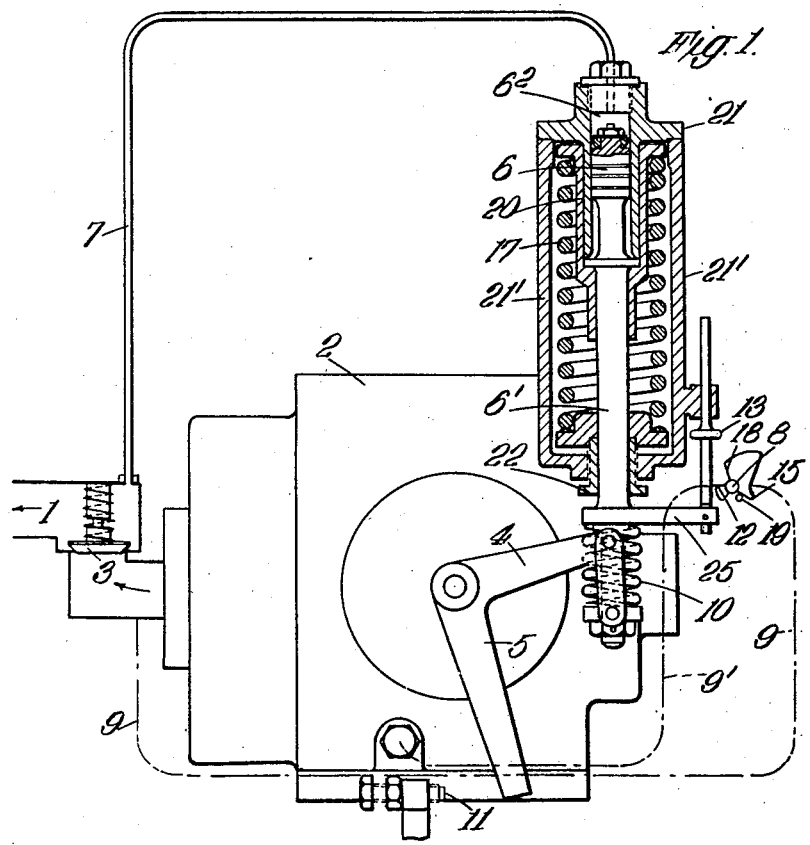
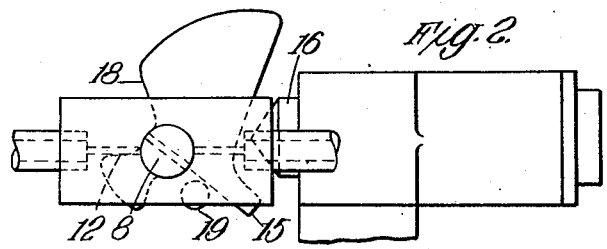
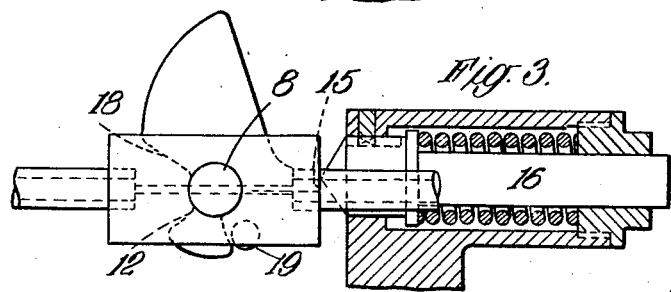
Inventor:
William Wallace

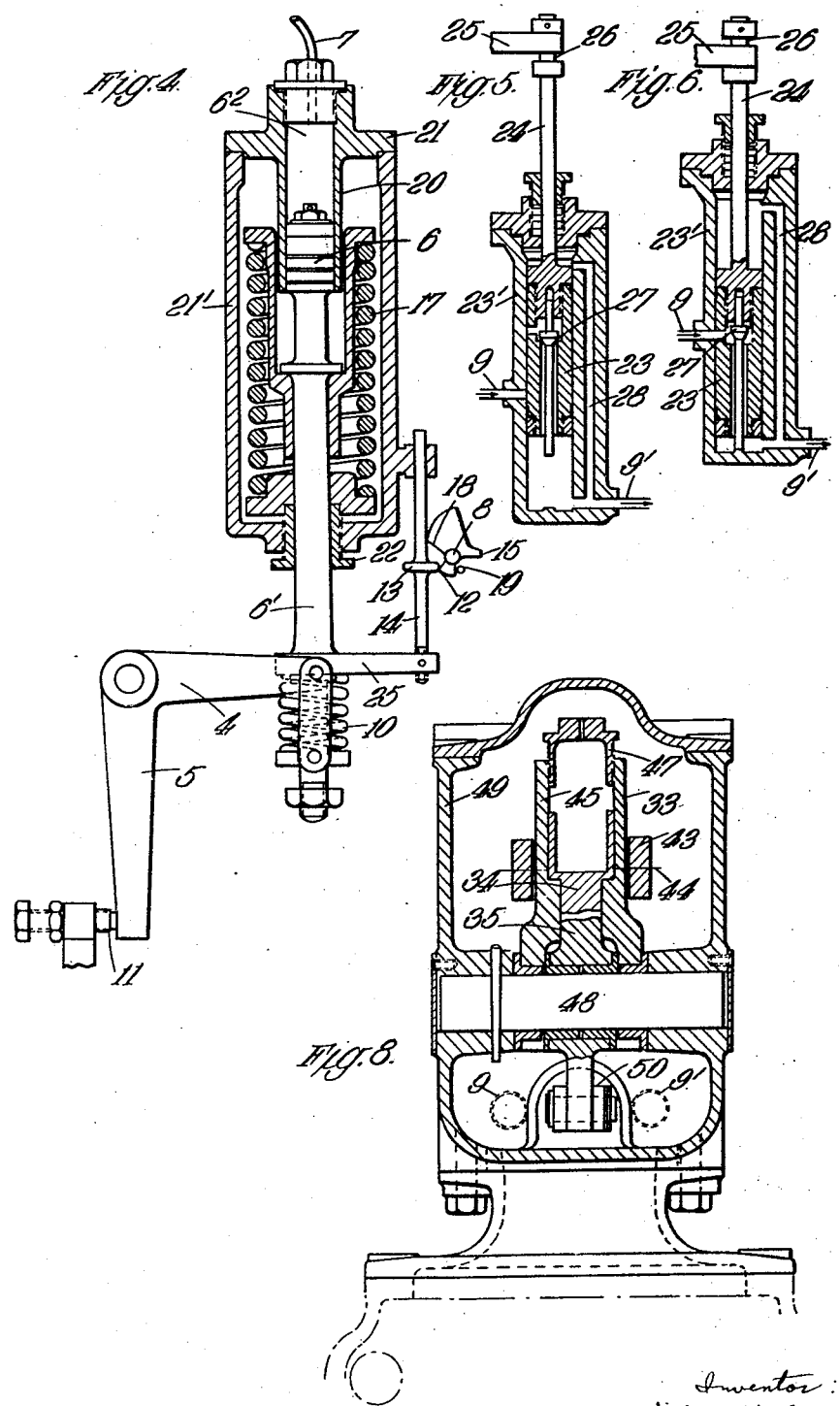

Feb. 20, 1934.        W. WALLACE         1,947,540
CONTROL GEAR FOR VARIABLE DELIVERY PUMPS
Filed April 2, 1931      3 Sheets-Sheet 3

Inventor:
William Wallace
By
Pennie Davis Marvin & Edmonds
attorneys

Patented Feb. 20, 1934

1,947,540

UNITED STATES PATENT OFFICE 1,947,540

CONTROL GEAR FOR VARIABLE DELIVERY PUMPS

William Wallace, Edinburgh, Scotland, assignor to The Variable Speed Gear Limited, Newcastle-upon-Tyne, England, a British Company Application April 2, 1931, Serial No. 527,224, and in Great Britain April 26, 1930

12 Claims. (Cl. 103—38)

This invention relates to improvements in control gear for variable delivery pumps the delivery of which can be varied by pressure operated mechanism.

It is known to control the delivery from variable delivery pumps by a spring-loaded piston or plunger. With this known arrangement, with no pressure in the discharge pipe line, the spring maintains the pump at full stroke. As the pressure rises in the pipe line, the load on the piston gradually compresses the spring until at a predetermined pressure the pump is brought to the zero or no-stroke position, so that, while continuing to operate, it discharges no fluid, but maintains the maximum pressure in the pipe line.

With this known arrangement the pump when running in substantially no-stroke position is pumping its own leakage losses at maximum pressure, and all thrust parts of the pump are subject to maximum loading.

The present invention is contrived to overcome the drawbacks inherent in known constructions, the arrangement being such that, when the maximum working pressure in the system is reached, the pump is brought practically to the zero or no-stroke position, but is left with sufficient stroke to permit it to continue pumping a small amount of fluid.

Assuming that no fluid is required by the mechanism to which fluid is being supplied, then the fluid which is being pumped increases the pressure in the system, which further depresses the operating piston, this further depression being permitted by interposing a spring connection between the piston and the pump control member, the spring being sufficiently stiff to overcome the effort required to operate the pump control. When the pressure in the system rises a predetermined amount above the pressure at which the pump has been brought to almost no-stroke position, a by-pass valve opens. The pump is now relieved completely from pressure and simply circulates fluid in a by-pass circuit. To maintain the pressure in the working circuit, a check valve is interposed between the pump and the main delivery pipe. A connection to the by-pass valve is taken from the underside of the check valve, and a connection to the operating piston is taken from the upper side of the check valve. A second connection from the by-pass valve is led to the non-pressure side of the system. Under these conditions, so long as no fluid is taken from the main system, the pump idles. Immediately, however, pressure falls in the working circuit, the piston is lifted by the spring action and the by-pass valve is closed; with further drop of pressure the stroke of the pump is increased.

The by-pass valve may be rotatable and operated by means of a tappet actuating a cam, a spring- or hydraulic-pressure-urged plunger cooperative with the cam causing the by-pass valve to close and/or open quickly; or the by-pass valve may comprise a plunger having a lost motion connection with the pump control piston and movable in a cylinder piped to the delivery system and to the pump casing or to a tank and adapted to be unseated in the over travel movement of the piston; or the by-pass valve may be hydraulically operated, opening when the predetermined maximum pressure is exceeded so as to permit fluid delivered by the pump to be by-passed to the pump casing or to a tank, and closing when the pressure falls to the normal maximum working pressure of the hydraulic system.

Figure 9:
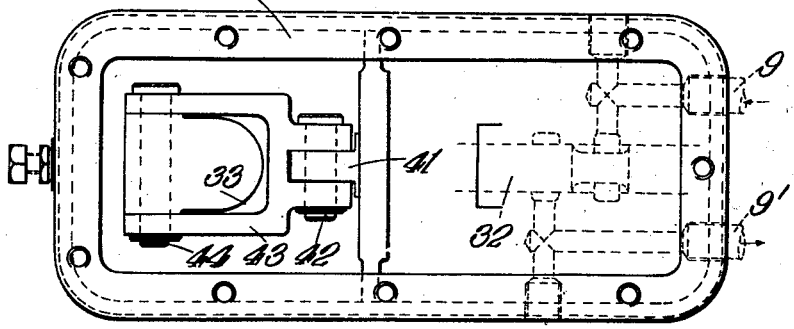

The invention is illustrated in the accompanying drawings in which Figures 1–4 show one embodiment, Figure 1 being a part elevation part section showing the general arrangement of the control gear; Figures 2 and 3 are fragmentary detail views drawn to a larger scale showing the by-pass valve in closed position and in open position, respectively. Figure 4 is a fragmentary detail view showing the control gear in minimum delivery position with the by-pass valve in open position. Figures 5 and 6 show in closed position and in open position, respectively, a modified form of by-pass valve. Figures 7, 8 and 9 show a modified arrangement in which the by-pass valve is operated independently of the pump control piston, Figure 7 being a vertical section, Figure 8 a vertical section at right angles to Figure 7 and Figure 9 a plan view.

Referring to Figures 1–4, 2 denotes the pump controlled by a spring-loaded pump control piston 6 influenced in opposition to the action of a spring 17 by fluid load from the delivery pipe 1, the chamber $6^2$ above the piston 6 being connected to the pipe 1 by means of a pipe 7.

3 denotes a check valve interposed in the pipe 1 adjacent to the pump 2.

The arrangement is such that, when a predetermined maximum working pressure in the pipe 1 is exceeded, the pump 2 idles and is not subjected to the pressure in the pipe 1, being isolated therefrom by the check valve 3.

The piston 6 is operatively connected to the arm 4 of a bell-crank pump control lever 4, 5 and is adapted, when the predetermined working pressure is exceeded, to open a rotary by-pass valve 8, so that fluid delivered by the pump is by-passed by way of pipes 9, 9¹ to the pump casing, and, when said predetermined maximum working pressure is restored, to effect closure of said valve 8. The piston 6 is operatively connected to the lever arm 4 through the medium of a compression spring 10 adapted to permit over-travel of the piston 6 on the maximum working pressure being exceeded, when the lever arm 5 abuts on an adjustable stop 11 in the minimum delivery position of the lever 4, 5, in which latter position the pump 2 delivers a small quantity only of fluid. The by-pass valve comprises a rotary ported plug 8 presenting a cam including an edge 12 engageable in the over-travel movement of the piston 6 to open the by-pass valve as shown in Figure 4 by a collar 13 on a vertically movable tappet 14 attached to a member 25 moving with the piston 6, another edge 15 of said cam being engaged in the open position of the by-pass valve shown in Figure 3 by a spring-urged plunger 16 which serves to impart quick closing movement to the by-pass valve 8 when the piston 6 is permitted to rise under the action of its springs on decrease of pressure in the pipe 1.

In the initial upward movement of the piston 6 the by-pass valve 8 closes, and, on further loss of pressure in the pipe 1, the piston continues to move upwardly, followed by rocking movement of the lever 4, 5 away from the stop 11 whereby the pump delivery is increased to restore and maintain the maximum working pressure in known manner.

Closure of the by-pass valve 8 is initiated when the tappet collar 13 engages the edge 18 of the cam, the plunger 16 thereafter functioning as described.

19 denotes a stop adapted to limit the rotary movement of the by-pass valve 8.

The piston 6 operates in a cylinder 20 defining the chamber 6² and unitary with a cover 21 applied to the top of a cylindrical casing 21¹ housing the spring 17 and provided at its lower end with a guide bush 22 through which passes the piston rod 6¹.

As will be understood, in operation, increase of pressure towards the predetermined maximum in the pipe 1 is accompanied by depression of the piston 6 and reduction of the pump delivery until, when the predetermined maximum pressure in the pipe 1 is reached, the lever arm 5 abuts on the stop 11. Increase of pressure above said predetermined maximum effects further depression of the piston 6 accompanied by further compression of the spring 17 and by compression of the spring 10 and opening of the by-pass valve 8, whereupon the pump is enabled to idle at low pressure until the pressure on the outlet side of the check valve 3 drops to the maximum, said drop being accompanied by closure of the by-pass valve. Loss of pressure below the maximum is accompanied by increase of the pump delivery as already explained.

The spring 10 needs only to be sufficiently stiff to transmit the effort required to operate the pump control lever 4, 5.

Figures 5 and 6 show an alternative construction of by-pass valve including a plunger 23 operating in a cylinder 23¹ and having a stem 24 operatively connected to the member 25 on the piston rod 6¹ through the medium of a lost motion connection 26. Housed within the plunger 23 is a by-pass valve proper 27 which, in the over-travel movement of the piston 6, when the plunger 23 reaches the end of its downward travel, is unseated as shown in Figure 6 to interconnect the pipes 9, 9¹ which are connected to ports in the cylinder 23¹.

A balance passage 28 in the cylinder 23¹ ensures axial balance of the plunger 23.

Figures 7, 8 and 9 show a modified arrangement which provides actuation of the by-pass valve independently of the pump control piston. In these Figures 30 denotes a spring-loaded by-pass valve control piston influenced by pressure in the pump delivery system by way of a pipe 31 and adapted, when the predetermined maximum working pressure is exceeded, to effect opening of a by-pass valve 32 and, on restoration of said maximum working pressure, to effect closure of said valve 32, the valve 32 being interposed in the by-pass pipes 9, 9¹ (Figure 1).

The piston 30 is operatively connected to a rock lever 33 carrying a spring urged detent 34 engaging a detent lever 35 operatively connected to the valve 32, the arrangement being such that, when the predetermined maximum working pressure is exceeded and when said pressure is restored, the detent 34 trips the lever 35 whereby to open and to close the valve 32. The detent 34 presents a cam nose 36 engaging a nose 37 on the lever 35, so that, in one limiting angular position of the detent 34 the lever 35 is tripped to effect opening of the valve 32, and, in another limiting angular position of the detent 34, the lever 35 is tripped to effect closure of the valve 32. 38, 39 denote adjustable stops adapted to limit the trip movement of the lever 35. The piston 30 is loaded in opposition to its fluid load by a compression spring 40 and acts on the lever 33 through the medium of a rod 41 guided for endwise movement and pivotally connected at 42 to a forked link 43 which is pivotally connected at 44 to the lever 33. The detent 34 is movable in a recess 45 in the lever 33, being loaded by a compression spring 46 the stress of which is adjustable by manipulation of a cap-nut 47. The levers 33 and 35 are fulcrumed on a shaft 48 traversing a casing 49 which houses the entire mechanism. The by-pass valve 32 is of the piston type and is operatively connected to the lower 35 by means of a lengthwise adjustable link 50.

What I claim and desire to secure by Letters Patent of the United States is:—

1. Control gear for a variable delivery pump, comprising in combination a spring-loaded piston influenced by the pressure in the delivery system, a pump control member operated by said piston to vary the pump delivery, a by-pass conduit in which fluid circulates when a predetermined maximum working pressure in the pump delivery system is exceeded, a stop against which the pump control member bears in the minimum delivery position, a spring between said member and said piston permitting over travel of the latter when said member is in contact with said stop, a rotary by-pass valve controlling said conduit, a cam on said valve, a tappet moving with said piston for engaging said cam during the over travel movement of the piston, a plunger co-operating with said cam in the open position of the by-pass valve to impart quick closing movement to said valve when the piston recedes on decrease of pressure in the delivery system, and a check valve for isolating the pump from the delivery system when the predetermined maximum working pressure in the pump delivery is exceeded.

2. Control gear for a variable delivery pump, comprising in combination a spring-loaded piston influenced by the pressure in the delivery system, a pump control member operated by said piston to vary the pump delivery, a by-pass conduit in which fluid circulates when a predetermined maximum working pressure in the pump delivery system is exceeded, a check valve for isolating the pump from the delivery system at such time, a stop against which the pump control member bears in the minimum delivery position, a spring between said member and the piston permitting over travel of the latter when said member is in contact with the stop, a plunger, a lost motion connection between said plunger and said piston, and a by-pass valve carried by said plunger and adapted to be unseated during the over travel movement of the piston.

3. Control gear for a variable delivery pump, comprising in combination a spring-loaded piston influenced by the pressure in the delivery system, a pump control member operated by said piston to vary the pump delivery, a by-pass conduit in which fluid circulates when a predetermined maximum working pressure in the pump delivery system is exceeded, a by-pass valve controlling said conduit, a check valve for isolating the pump from the delivery at such time, a spring-loaded control piston influenced by the pressure in the delivery system, a rock lever operatively connected to said piston, a spring-controlled detent carried by said rock lever, and a detent lever operatively connected to the by-pass valve so that, when the predetermined maximum working pressure is exceeded, said detent trips said detent lever to open the by-pass valve, and when said pressure is restored said detent trips said detent lever to close the by-pass valve.

4. Control gear for a variable delivery pump, comprising in combination with the elements claimed in claim 3, a cam nose on the detent, and a cam nose on the detent lever, said cam noses co-operating so that in one limiting angular position of the detent the detent lever is tripped by the detent to effect the opening of the by-pass valve and in another limiting angular position of the detent the detent lever is tripped by the detent to effect closure of the by-pass valve.

5. Control gear for a variable-delivery pump, comprising a resiliently-loaded piston, said piston being acted on and actuated by the pressure in the pump delivery system, a pump control member, a yielding connection between said piston and said member, a stop for limiting the movement of said member when it is moved by the piston to a minimum pump stroke position, a pump by-pass conduit, a by-pass valve controlling the flow of the fluid to said conduit, and a valve-operating member arranged to be actuated by the piston to open the valve during the continued movement of the piston permitted by the yielding connection and caused by further increase of pressure after the pump control member has reached its minimum pump stroke position.

6. Control gear for a variable-delivery pump, comprising a resiliently-loaded piston, said piston being acted on and actuated by the pressure in the pump delivery-system, a pump control-member adapted to be moved by said piston to a minimum pump-stroke position when a predetermined pressure in said system is reached, a stop for limiting the movement of said member when it reaches said minimum pump-stroke position, means preventing relative movement between the piston and control member at the lost motion connection until the control member engages the stop but permitting continued movement of the piston when the control member is in engagement with the stop, a pump by-pass conduit, a rotary-ported plug constituting a by-pass valve for controlling the flow of the fluid to said conduit, a cam carried by said plug, a member arranged to be actuated by the piston to engage the cam and open the valve when the pressure in said system is increased beyond said predetermined pressure by the continued action of the pump at its minimum stroke, a yieldingly-pressed plunger for engaging the cam and imparting a quick-closing movement thereto upon decrease of pressure in the delivery system, and a non-return valve between the pump and the delivery system.

7. Control gear for a variable-delivery pump, comprising a pump delivery system, a non-return valve in the delivery system, a pump stroke control member, means for controlling the adjustment of said member which means causes said member to be moved to a minimum pump stroke position when a predetermined pressure in said system is reached, a stop to limit the movement of said member at its minimum pump stroke position, a conduit leading from the pump delivery system on the pressure side of the non-return valve (which is the side opposite to the pump, so that the valve is between the conduit and the pump) said conduit being connected with said means whereby said means is actuated by the pressure in said system, a pump by-pass conduit connected to the pump delivery system on the pump side of said valve, a by-pass valve controlling supply of fluid to the by-pass conduit, and means whereby the operation of the by-pass valve is controlled by the pressure in the pump delivery system on the pressure side of said valve for opening the by-pass valve when the pressure in said system is increased beyond said predetermined pressure by the continued action of the pump at its minimum stroke.

8. Control gear for a variable delivery pump comprising a resiliently loaded piston constantly under the direct influence of the pressure in the pump delivery system so as to avoid any appreciable time lag between increase of pressure and movement of the piston, a pump stroke control member which is moved by said piston to a minimum pump stroke position when a predetermined pressure in said system is reached, a stop to limit the pump control member at the minimum pump stroke position a non-return valve in the pump delivery system, a pump by-pass conduit connected with the pump delivery system on the pump side of the non-return valve, a by-pass valve controlling flow of fluid to the conduit, a member which opens the by-pass valve when the pressure in said system is increased beyond said predetermined presure by the continued action of the pump at its minimum stroke, and means for automatically closing the by-pass valve when the pressure in the delivery system falls below the pressure required to open the valve and before the pressure in the delivery system falls to the degree required for bringing the pump control member to its minimum stroke position.

9. Control gear for a variable delivery pump comprising a resiliently loaded piston influenced by the pressure in the pump delivery system, a pump stroke control member which is moved by said piston to a minimum pump stroke position when a predetermined pressure in said system is reached, a stop to limit the pump control member at the minimum pump stroke position, a non-return valve in the pump delivery system, a pump by-pass conduit connected with the pump delivery system on the pump side of the non-return valve, a by-pass valve controlling flow of fluid to the conduit, and a member which opens the by-pass valve when the pressure in said system is increased beyond said predetermined pressure by the continued action of the pump at its minimum stroke.

10. Control gear for a variable delivery pump comprising a resiliently loaded piston constantly under the direct influence of the pressure in the pump delivery system so as to avoid any appreciable time lag between increase of pressure and movement of the piston, a pump stroke control member which is moved by said piston to a minimum pump stroke position when a predetermined pressure in said system is reached, a stop to limit the pump control member at its minimum pump stroke position, a non-return valve in the pump delivery system, a pump by-pass conduit between the pump delivery system and the pump suction and connected with the pump delivery system on the pump side of the non-return valve, a by-pass valve controlling flow of fluid to the conduit, a member constantly under the influence of the pressure in the pump delivery system and constantly resiliently urged against said pressure and which member opens the by-pass valve when the pressure in said system is increased beyond said predetermined pressure by the continued action of the pump at its minimum stroke, and means for automatically closing the by-pass valve when the pressure in the delivery system falls below the pressure required to open the valve and before the pressure in the delivery system falls to the degree required for bringing the pump control member to its minimum stroke position, the arrangement being such that when the pressure in the pump delivery system remains high the pump control member will remain steady at minimum pump stroke position and the pump will operate at minimum stroke with the by-pass valve open but with the occasional closing and opening of the by-pass valve to maintain said pressure if it is reduced by leakage.

11. Control gear for variable delivery pump, comprising a pump delivery system, a non-return valve in the delivery system, a pump stroke control member, means for controlling the adjustment of said member which means causes said member to be moved to a minimum pump stroke position when a predetermined pressure in said system is reached, a stop to limit the movement of said member at its minimum pump stroke position, a conduit leading from the pump delivery system on the pressure side of the non-return valve (which is the side opposite to the pump, so that the valve is between the conduit and the pump) said conduit being connected with said means whereby said means is actuated by the pressure in said system, a pump by-pass conduit connected to the pump delivery system on the pump side of said valve, a by-pass valve controlling supply of fluid to the by-pass conduit, said by-pass valve being unaffected by the pressure in the by-pass conduit, and means constantly under the influence of the pressure in the pump delivery system on the pressure side of said valve for opening the by-pass valve when the pressure in said system is increased beyond said predetermined pressure by the continued action of the pump at its minimum stroke.

12. Control gear for variable delivery pump, comprising a pump delivery system, a non-return valve in the delivery system, a pump stroke control member, a piston for controlling the adjustment of said member, a conduit leading from the pump delivery system on the pressure side of the non-return valve (which is the side opposite to the pump) so that the valve is between the conduit and the pump, said conduit conducting pressure to said piston, resilient means urging the piston contrary to said pressure, a stop to limit the movement of said member at its minimum pump stroke position, a pump by-pass conduit connected to the pump delivery system on the pump side of said valve, a by-pass valve controlling supply of fluid to the by-pass conduit, a second piston, a pressure supply system to said second piston from the pump delivery system on the pressure side of said non-return valve, means for resiliently loading said second piston contrary to the pressure supply thereof, said resilient loading being to a heavier extent than the resilient loading on the first mentioned piston, connections between the by-pass valve and the second piston whereby the by-pass valve is actuated at a higher pressure than that required to bring the pump control member to its minimum pump stroke position.

WILLIAM WALLACE.